United States Patent
Hyun et al.

(10) Patent No.: US 10,799,887 B2
(45) Date of Patent: Oct. 13, 2020

(54) DUST COLLECTOR AND CLEANER HAVING THE SAME

(71) Applicant: LG ELECTRONICS INC., Seoul (KR)

(72) Inventors: Kietak Hyun, Seoul (KR); Soohan Eo, Seoul (KR); Sangchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 15/941,181

(22) Filed: Mar. 30, 2018

(65) Prior Publication Data

US 2019/0091702 A1   Mar. 28, 2019

(30) Foreign Application Priority Data

Sep. 22, 2017   (KR) .................. 10-2017-0122603

(51) Int. Cl.
*B01D 50/00* (2006.01)
*B04C 7/00* (2006.01)
(Continued)

(52) U.S. Cl.
CPC ............... *B04C 7/00* (2013.01); *A47L 5/362* (2013.01); *A47L 9/165* (2013.01); *A47L 9/1608* (2013.01);
(Continued)

(58) Field of Classification Search
CPC .... B04C 5/26; B04C 3/04; B04C 3/06; B04C 5/13; B04C 5/28; B04C 5/185;
(Continued)

(56) References Cited

U.S. PATENT DOCUMENTS 2,553,175 A * 5/1951 Davenport ............... B04C 5/24
                                                              55/343
3,074,218 A * 1/1963 O'Dell ..................... B04C 5/28
                                                              55/343
(Continued)

FOREIGN PATENT DOCUMENTS

KR        10-0844621           7/2008
KR     10-2010-0093446         8/2010
(Continued)

OTHER PUBLICATIONS

PCT International Search Report dated Feb. 22, 2018 issued in Application No. PCT/KR2017/011379.
(Continued)

*Primary Examiner* — Dung H Bui
(74) *Attorney, Agent, or Firm* — KED & Associates, LLP

(57) ABSTRACT

A dust collector includes a cylindrical housing forming an outer appearance of the dust collector; a cyclone formed inside the housing to cause a swirling flow to separate dust from air introduced into the housing; axial inlet type swirl tubes to receive air and fine dust that have passed through the cyclone, and causing a swirling flow to separate the fine dust from the air; and a mesh configured to surround an outside of the axial inlet type swirl tubes to form a boundary between the cyclone and the axial inlet type swirl tubes, wherein the axial inlet type swirl tubes are configured with four groups and stacked in multiple stages on virtual quadrants, the axial inlet type swirl tubes arranged in the same quadrant are arranged to face the same direction, and the axial inlet type swirl tubes arranged in different quadrants are arranged to face different directions.

20 Claims, 7 Drawing Sheets

(51) Int. Cl.
*A47L 9/16* (2006.01)
*B01D 45/16* (2006.01)
*B04C 3/06* (2006.01)
*B04C 3/04* (2006.01)
*B04C 9/00* (2006.01)
*B04C 5/04* (2006.01)
*A47L 5/36* (2006.01)

(52) U.S. Cl.
CPC ........... *A47L 9/1616* (2013.01); *A47L 9/1625* (2013.01); *A47L 9/1641* (2013.01); *A47L 9/1666* (2013.01); *A47L 9/1683* (2013.01); *B01D 45/16* (2013.01); *B01D 50/002* (2013.01); *B04C 3/04* (2013.01); *B04C 3/06* (2013.01); *B04C 5/04* (2013.01); *B04C 9/00* (2013.01); *A47L 2201/00* (2013.01); *B04C 2009/002* (2013.01)

(58) Field of Classification Search
CPC ........ B04C 5/06; A47L 9/1683; A47L 9/1608; A47L 9/1666; A47L 5/362; A47L 9/165; A47L 9/1641; A47L 9/1625; A47L 2201/00; B01D 45/16
See application file for complete search history.

(56) References Cited

U.S. PATENT DOCUMENTS

| | | | | |
|---|---|---|---|---|
| 3,375,058 | A * | 3/1968 | Petersen | C01B 17/76 423/2 |
| 3,386,588 | A * | 6/1968 | Ades | B04C 5/28 210/512.2 |
| 3,425,192 | A * | 2/1969 | Davis | A47L 9/1641 55/345 |
| 3,541,766 | A * | 11/1970 | Wilson | B01J 8/005 55/348 |
| 3,747,306 | A * | 7/1973 | Wikdahl | B01D 53/24 55/349 |
| 3,915,679 | A * | 10/1975 | Roach | B04C 3/04 55/347 |
| 4,537,608 | A * | 8/1985 | Koslow | B01D 50/002 55/337 |
| 4,702,846 | A * | 10/1987 | Ryynanen | B01D 45/12 209/722 |
| 5,129,124 | A * | 7/1992 | Gamou | A47L 5/14 15/352 |
| 5,403,367 | A * | 4/1995 | De Villiers | B01D 39/1615 55/320 |
| 5,681,450 | A * | 10/1997 | Chitnis | B01J 8/0055 208/100 |
| 7,462,212 | B2 * | 12/2008 | Han | A47L 9/1625 55/343 |
| 7,604,674 | B2 | 10/2009 | Han et al. | |
| 7,655,058 | B2 * | 2/2010 | Smith | A47L 9/165 15/353 |
| 7,770,256 | B1 | 8/2010 | Fester | |
| 7,799,106 | B2 * | 9/2010 | Rother | B01D 45/16 55/345 |
| 7,803,205 | B2 * | 9/2010 | Oh | A47L 9/122 55/337 |
| 7,976,597 | B2 * | 7/2011 | Smith | A47L 9/1625 15/352 |
| 8,101,001 | B2 * | 1/2012 | Qian | A47L 9/1625 15/353 |
| 8,262,761 | B2 * | 9/2012 | Babb | B01D 45/16 29/525.11 |
| 8,657,904 | B2 * | 2/2014 | Smith | A47L 5/24 55/343 |
| 8,914,941 | B2 * | 12/2014 | Kim | A47L 9/1641 15/353 |
| 2003/0057151 | A1 * | 3/2003 | Kopec | B01D 45/12 210/512.2 |
| 2007/0234691 | A1 * | 10/2007 | Han | A47L 9/1608 55/457 |
| 2008/0190080 | A1 * | 8/2008 | Oh | A47L 9/1625 55/343 |
| 2009/0031524 | A1 * | 2/2009 | Courtney | A47L 9/1625 15/347 |
| 2009/0265883 | A1 * | 10/2009 | Reed, Jr. | A47L 9/1608 15/353 |
| 2010/0005617 | A1 | 1/2010 | Hyun et al. | |
| 2010/0115727 | A1 * | 5/2010 | Oh | A47L 9/1625 15/347 |
| 2010/0275561 | A1 * | 11/2010 | Lundquist | B04C 3/00 55/456 |
| 2013/0031878 | A1 * | 2/2013 | Menssen | B01D 45/16 55/345 |
| 2013/0255203 | A1 * | 10/2013 | Muenkel | B01D 46/0021 55/337 |
| 2014/0373490 | A1 * | 12/2014 | Wuebbeling | B01D 45/16 55/345 |
| 2016/0088988 | A1 * | 3/2016 | Eo | B04C 3/04 15/353 |
| 2017/0247896 | A1 * | 8/2017 | Hayes | B04C 5/24 |

FOREIGN PATENT DOCUMENTS

| | | |
|---|---|---|
| KR | 10-2015-0031304 | 3/2015 |
| KR | 10-2015-0109045 | 10/2015 |
| KR | 10-2016-0089201 | 7/2016 |

OTHER PUBLICATIONS

PCT International Search Report dated Feb. 22, 2018 issued in Application No. PCT/KR2017/011380.
PCT International Search Report dated Feb. 22, 2018 issued in Application No. PCT/KR2017/011381.
PCT International Search Report dated Feb. 22, 2018 issued in Application No. PCT/KR2017/011382.
United States Notice of Allowance dated Feb. 5, 2020 issued in U.S. Appl. No. 15/941,388.
United States Office Action dated Apr. 1, 2020 issued in U.S. Appl. No. 15/940,582.

* cited by examiner

DUST COLLECTOR AND CLEANER HAVING THE SAME

CROSS-REFERENCE TO RELATED APPLICATION

This application claims priority under 35 U.S.C. § 119 to Korean Application No. 10-2017-0122603, filed on Sep. 22, 2017, whose entire disclosure is hereby incorporated by reference.

BACKGROUND

1. Field

The present disclosure relates to a vacuum cleaner for sucking air and dust using a suction force, separating dust from the sucked air to collect dust, and discharging only clean air, and a dust collector provided in the vacuum cleaner.

2. Background

A vacuum cleaner refers to a device for sucking dust and air using a suction force generated by a suction motor mounted inside a cleaner body, and separating and collecting dust from the air.

Such vacuum cleaners are classified into a canister cleaner, an upright cleaner, a stick cleaner, a handy cleaner, and a robot cleaner. In case of the canister cleaner, a suction nozzle for suctioning dust is provided separately from a cleaner body, and the cleaner body and the suction nozzle are connected to each other by a connecting device. In case of the upright cleaner, the suction nozzle is rotatably connected to the cleaner body. In case of the stick cleaner and the handy cleaner, a user uses the cleaner body while holding it with his or her hand. However, in case of the stick cleaner, the suction motor is provided close to the suction nozzle (lower center), and in case of the handy vacuum cleaner, the suction motor is provided close to a grip portion (upper center). The robot cleaner performs cleaning by itself while traveling through an autonomous driving system.

There are currently disclosed many vacuum cleaners employing a multi-cyclone. Cyclone refers to a device for forming a swirling flow in a fluid and separating air and dust from each other using a centrifugal force difference resulting from a weight difference between the air and the dust. The term "multi-cyclone" refers to a structure for separating air and dust from each other using a primary cyclone, and separating air and fine dust from each other using a plurality of secondary cyclones. Here, dust and fine dust are classified by size.

For example, Korean Patent Laid-Open Publication No. 10-2015-0031304 (published on Mar. 23, 2015) discloses a cleaning device employing a multi-cyclone. The dust and fine dust which are introduced into an inside of the body along with the air are sequentially separated from the air by the primary cyclone and the secondary cyclones. A vacuum cleaner employing a cyclone has an advantage of not requiring a separate replaceable dust bag.

A cone structure is formed particularly in a body (cylinder) of a secondary cyclone in a multi-cyclone. The cone denotes a shape in which a cross-sectional area of the secondary cyclone becomes smaller toward one side. The air and fine dust introduced into the secondary cyclone are separated from each other in the secondary cyclone. The fine dust is discharged to a fine dust outlet along the cone, and the air is discharged to an air outlet formed in a direction opposite to an outlet of the fine dust.

Such a structure has a problem of causing flow loss. As a flow direction of the air changes frequently, flow loss occurs because an inlet of the secondary cyclone and the air outlet are formed on the same side with each other. The air is introduced into the inlet of the secondary cyclone, changes its direction within the secondary cyclone, and discharged again to the air outlet, thereby causing flow loss during the process.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein:

FIG. 3 is a perspective view illustrating a shape in which an upper portion of the dust collector illustrated in FIG. 2 is cut-through;

DETAILED DESCRIPTION

Figure 1:
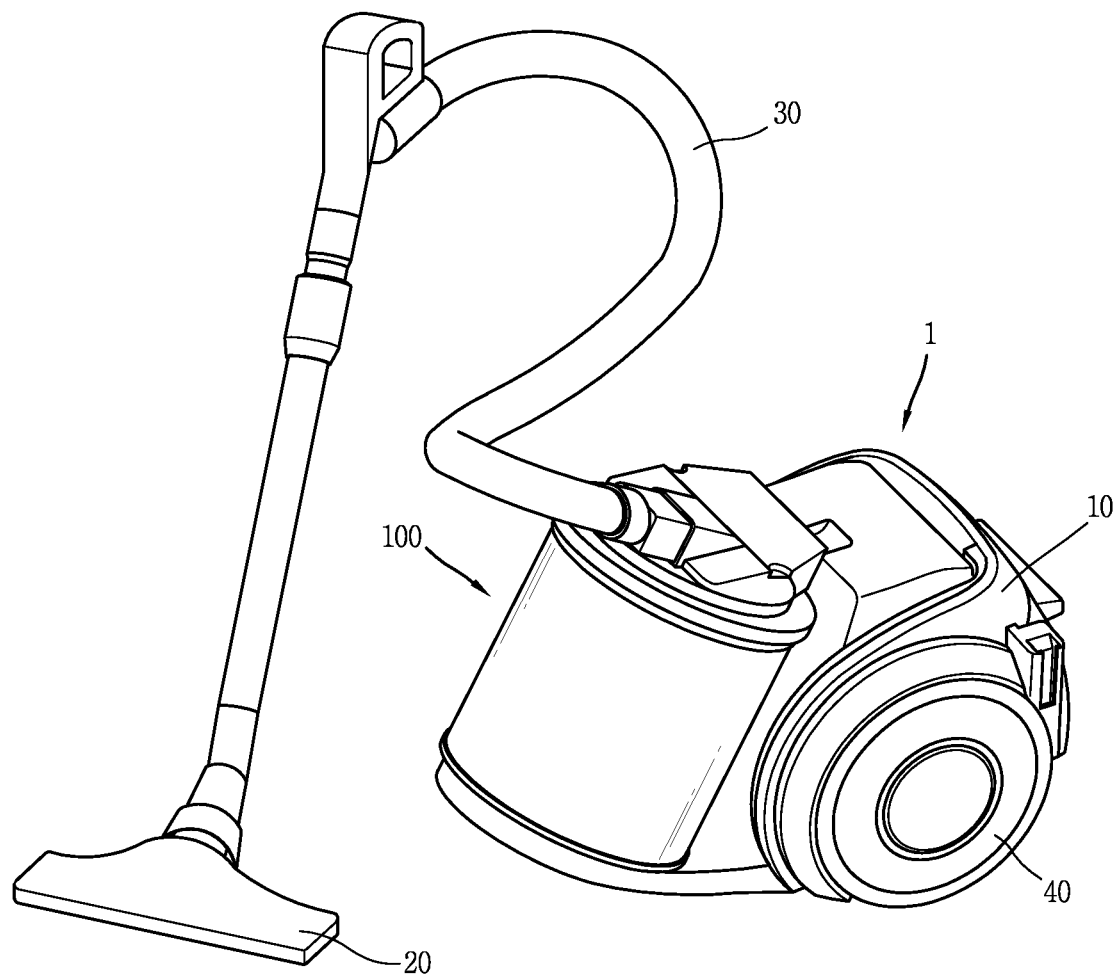
FIG. 1 is a perspective view illustrating an example of a vacuum cleaner associated with the present disclosure.

Hereinafter, a dust collector associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

For reference, a dust collector 100 applied to a canister-type vacuum cleaner 1 is illustrated in the present drawing, but the dust collector 100 of the present disclosure is not necessarily limited to the canister-type vacuum cleaner 1. For example, the dust collector 100 of the present disclosure may also be applicable to an upright type vacuum cleaner, and the dust collector may be applicable to all types of vacuum cleaners.

FIG. 1 is a perspective view illustrating an example of a vacuum cleaner 1 associated with the present disclosure. Referring to FIG. 1, the vacuum cleaner 1 includes a cleaner body 10, a suction nozzle (or suction head) 20, a connecting unit (or hose) 30, a wheel unit (or wheel) 40, and a dust collector 100.

The cleaner body 10 has a suction unit (not shown) for generating a suction force. The suction unit includes a suction motor and a suction fan rotated by the suction motor to generate a suction force.

The suction nozzle 20 is configured to suck air and foreign substances adjacent to the suction nozzle 20. Here, foreign substances have a concept referring to substances other than air, and including dust, fine dust, and ultra-fine dust. Dust, fine dust, and ultra-fine dust are classified by size, and fine dust is smaller than dust and larger than ultra-fine dust.

The connecting unit 30 is connected to the suction nozzle 20 and the dust collector 100, respectively, to transfer air containing foreign matter, dust, fine dust, ultra-fine dust, and the like, sucked through the suction nozzle 20, to the dust collector 100. The connecting unit 30 may be configured in the form of a hose or pipe.

The wheel unit 40 is rotatably coupled to the cleaner body 10 to move or rotate the cleaner body 10 in every direction. For an example, the wheel unit 40 may include main wheels and an auxiliary wheel. The main wheels may be respectively provided on both sides of the cleaner body 10, and the auxiliary wheel may be configured to support the main body 10 together with the main wheels, and assist the movement of the cleaner body 10 by the main wheels.

In the present disclosure, the suction nozzle 20, the connecting unit 30, and the wheel unit 40 may be applicable to a vacuum cleaner in the related art as they are, and thus the detailed description thereof will be omitted.

The dust collector 100 is detachably coupled to the cleaner body 10. The dust collector 100 is configured to separate and collect foreign matter from air sucked through the suction nozzle 20, and discharge the filtered air.

The vacuum cleaner in the related art has a structure in which the connecting unit is connected to the suction unit formed in the cleaner body, and air suctioned through a flow guide extended from the suction unit to the dust collector is introduced back into the dust collector. The sucked air is introduced into the dust collector by a suction force of the suction unit. However, there is a problem that the suction force is reduced while passing through the flow guide of the vacuum cleaner body.

On the contrary, in the vacuum cleaner 1 of the present disclosure, the connecting unit 30 is directly connected to the dust collector 100 as illustrated in the drawing. According to such a connection structure, air sucked through the suction nozzle 20 flows directly into the dust collector 100 to enhance the suction force compared to the related art. Furthermore, there is an advantage of not requiring the formation of a flow guide inside the cleaner body 10.

In addition, the secondary cyclone in which a cone structure is formed in the body (cylinder) causes flow loss. Hereinafter, the dust collector 100 having an axial inlet type swirl tube to suppress the flow loss of the secondary cyclone will be described.

Figure 2:
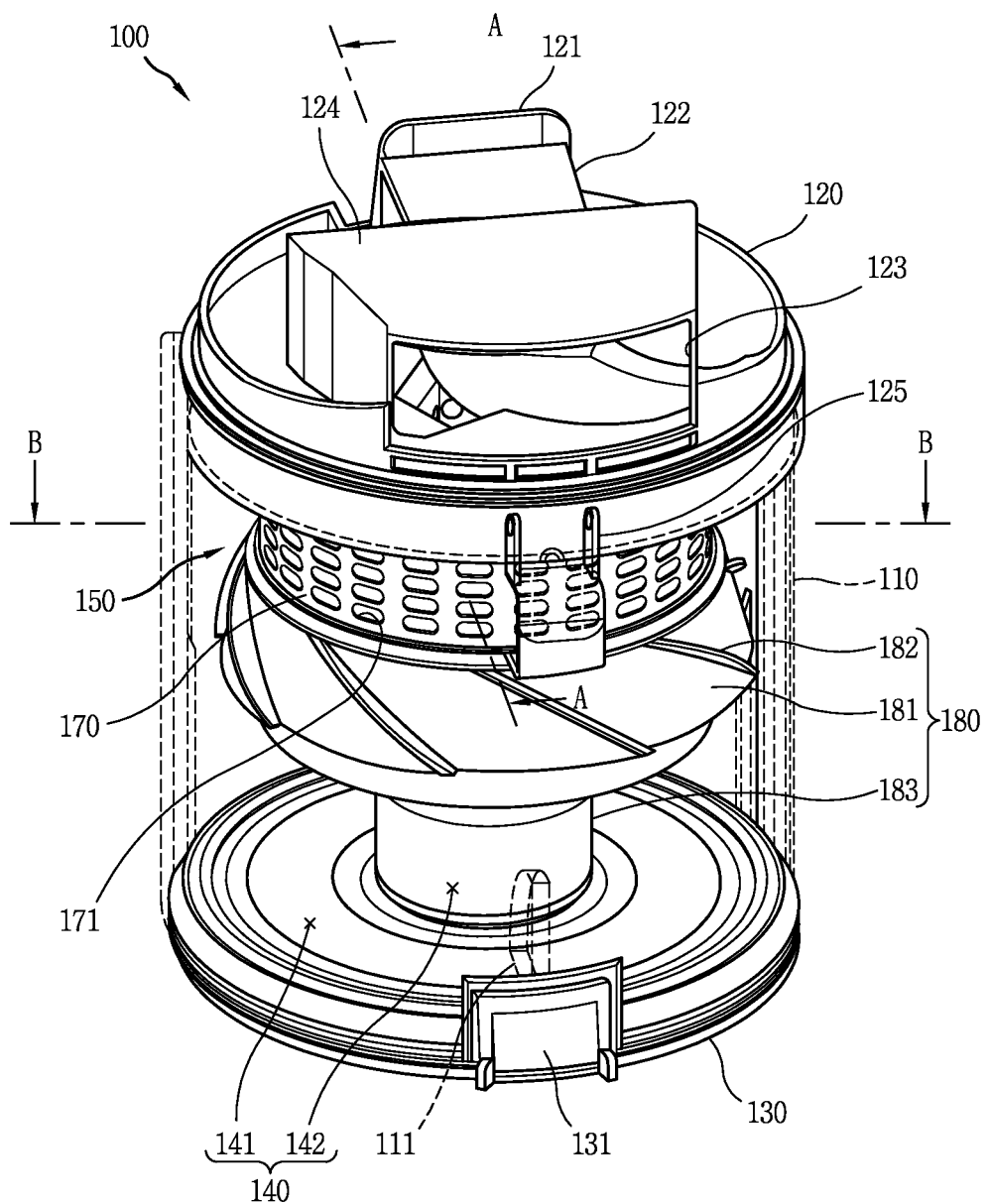
FIG. 2 is a perspective view of the dust collector illustrated in FIG. 1.
Figure 3:
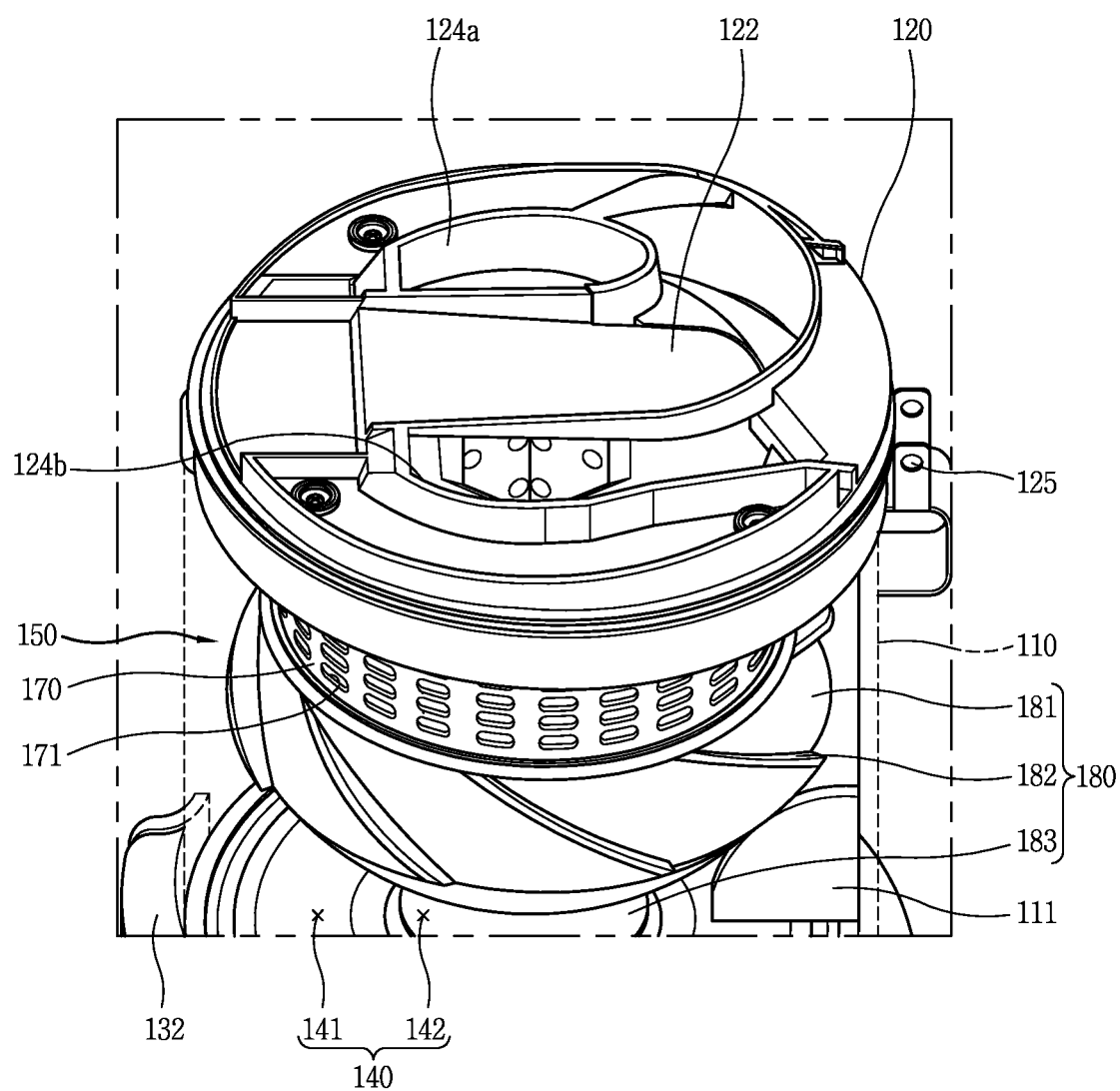

FIG. 2 is a perspective view of the dust collector 100 illustrated in FIG. 2. FIG. 3 is a perspective view illustrating a shape in which an upper portion of the dust collector 100 illustrated in FIG. 2 is cut-through. The dust collector 100 refers to a device for separating and collecting foreign matter (dust, fine dust, ultra-fine dust, etc.) from air sucked through the suction nozzle 20. The air flows along a flow path inside the dust collector 100 by a suction force generated by the suction unit, and the foreign matter is separated from the air by the structure of the dust collector 100 during the flow.

An outer appearance of the dust collector 100 is formed by a housing 110, an upper cover 120, and a lower cover 130. The housing 110 forms a lateral appearance of the dust collector 100. The housing 110 is configured to receive the internal components of the dust collector 100, such as a cyclone 150, axial inlet type swirl tubes (also referred to herein as axial inlet type cyclones or second cyclones) 160 (see FIG. 4) and a mesh 170, which will be described below. The housing 110 may be formed in a cylindrical shape in which a top and a bottom thereof are open, but is not limited thereto.

The upper cover 120 is coupled to an upper portion of the housing 110. The upper cover 120 may be rotatably coupled to the housing 110 by a hinge 125. When it is required to open the upper cover 120 and clean an inside of the dust collector 100, the upper cover 120 may be rotated about the hinge 125 to open an upper opening of the housing 110.

An inlet 121 and an outlet 123 of the dust collector 100 may be respectively formed on the upper cover 120. Referring to FIG. 2, the inlet 121 of the dust collector 100 may be formed on one side of the upper cover 120, and the outlet 123 of the dust collector 100 may be formed on the other side of the upper cover 120.

The inlet 121 of the dust collector 100 is connected to the suction nozzle 20 by the connecting unit 30. Therefore, air and foreign matter introduced through the suction nozzle 20 flow into the dust collector 100 through the connecting unit 30. Furthermore, the outlet of the dust collector 100 is connected to an internal flow path of the cleaner body 10. Accordingly, the air separated from the foreign matter by the dust collector 100 passes through the suction nozzle 20 along the internal flow path of the cleaner body 10 and is discharged to an outside of the cleaner body 10.

The upper cover 120 may be formed with an intake guide 122 and an exhaust guide 124, respectively. The intake guide 122 is formed on a downstream side of the inlet 121 and connected to an inside of the dust collector 100. The intake guide 122 extends downward from the center of the upper cover 120 to an inner circumferential surface of the housing 110 along a spiral direction. Therefore, the air guided by the intake guide 122 flows in a tangential direction toward the inner circumferential surface of the housing 110. Accordingly, a swirling flow is naturally formed in the air flowing into an inside of the housing 110.

The exhaust guide 124 is formed around the intake guide 122. The intake guide 122 and the exhaust guide 124 are partitioned from each other by a structure of the upper cover 120. The exhaust guide 124 may have a structure in which two branched paths 124a, 124b formed at both sides of the intake guide 122 are integrated into one path, and the outlet 123 of the dust collector 100 is formed on a downstream side of the exhaust guide 124.

A first dust collection unit (or first dust collection chamber) 141 for collecting dust and a second dust collection unit (or second dust collection chamber) 142 for collecting fine dust are formed at an inner side of the housing 110. The first dust collection unit 141 and the second dust collection unit 142 are formed in a region defined by the housing 110, the lower cover 130, and the like.

The first dust collection unit 141 is formed in a ring shape at an inner side of the housing 110. The first dust collection unit 141 is formed to collect dust falling down in the cyclone 150, which will be described later. A partition plate 111 may be formed in the first dust collection unit 141. The partition plate 111 may protrude from an inner circumferential surface of the housing 110 toward a dust collection unit boundary (or dust collection chamber boundary surface) 183.

The second dust collection unit 142 is formed in a region surrounded by the first dust collection unit 141. A cylindrically-shaped dust collection unit boundary 183 may be provided at an inner side of the housing 110 to partition the first dust collection unit 141 and the second dust collection unit 142. An outer side of the dust collecting boundary 183 corresponds to the first dust collection unit 141, and an inner side of the dust collection unit boundary 183 corresponds to the second dust collection unit 142. The second dust collection unit 142 is formed to collect fine dust falling from the axial inlet type swirl tubes 160 to be described later.

The lower cover 130 is coupled to a lower portion of the housing 110. The lower cover 130 forms the bottoms of the first dust collection unit 141 and the second dust collection unit 142. The lower cover 130 may be rotatably coupled to the housing 110 by a hinge 125. When required to open the lower cover 130 to discharge the dust collected in the first dust collection unit 141 and the fine dust collected in the second dust collection unit 142, a fastening between the upper cover 110 and the lower cover 130 is released to rotate the lower cover 130 about the hinge 125 so as to open a lower opening portion of the housing 110. The dust collected in the first dust collection unit 141 and the fine dust collected in the second dust collection unit 142 are discharged downward at a time by their respective weights.

The mesh 170 is provided at an inner side of the housing 110. The mesh 170 may be formed in a cylindrical shape having a smaller circumference than the housing 110. A plurality of holes 171 are formed on the mesh 170 and substances are filtered by the mesh 170 if they are larger in size than the holes 171 of the mesh 170.

A skirt 181 may be formed below the mesh 170. The skirt 181 may form a slope being closer to an inner surface of the housing 110 as it approaches the lower cover 130. The skirt 181 serves to prevent scattering of dust collected in the first dust collection unit 141.

Ribs 182 may protrude from an outer circumferential surface of the skirt 181 along a spiral direction. Ribs 182 induce a natural fall of the foreign matter filtered by the mesh 170 to collect the foreign matter in the first dust collection unit 141. Below the skirt 181, the dust collection unit boundary 183 described above is formed.

The skirt 181, the ribs 182, and the dust collection unit boundary 183 may be formed as an integral member. The member may be referred to as an inner housing 180.

The cyclone (or first cyclone) 150 is formed at an inner side of the housing 110. Specifically, the cyclone 150 is formed by the housing 110 and the mesh 170. The cyclone 150 generates a swirling flow to separate dust from the air introduced into an inner side of the housing 110. When a suction force provided from the suction motor installed at an inner side of the cleaner body exerts an influence on an inner side of the dust collector 100, the air and the foreign matter swirl in the cyclone 150.

When a swirling flow is formed in the air and foreign matter sucked in a tangential direction of the cyclone 150 by the intake guide 122, relatively light air and fine dust flow into the mesh 170 through the hole of the mesh 170. On the contrary, relatively heavy dust flows along an inner surface of the housing 110 and falls to the first dust collection unit 141.

The axial inlet type swirl tubes 160 are provided at an inner side of a region defined by the mesh 170. Hereinafter, the structure of one axial inlet type swirl tube (or axial inlet type cyclone) 160a will be described first, and subsequently the arrangement and operation of the axial inlet type swirl tubes 160 will be described.

Figure 4:
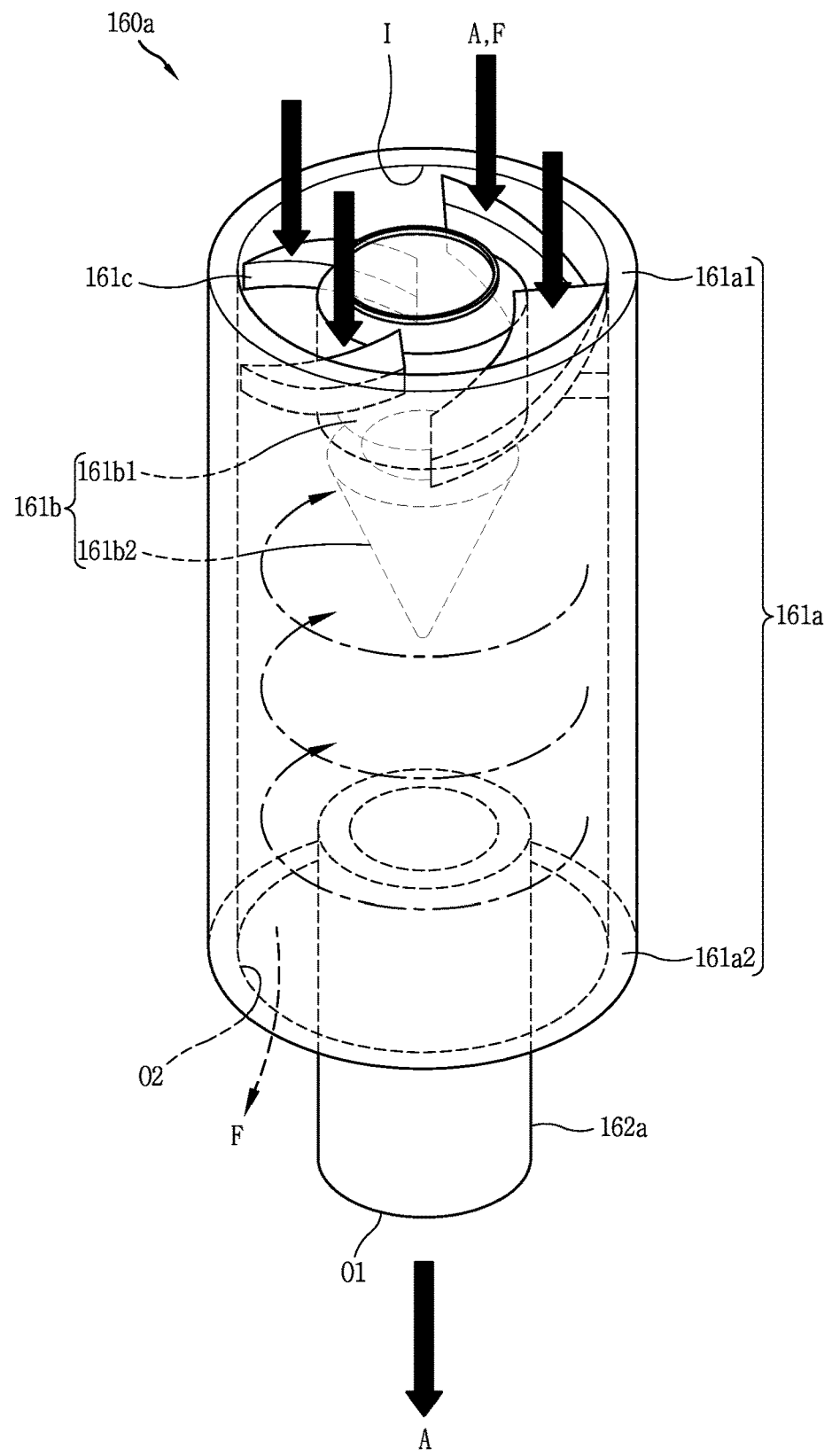
FIG. 4 is a perspective view of an axial inlet type swirl tube.

FIG. 4 is a perspective view of the axial inlet type swirl tube 160a. The axial inlet type swirl tube 160a is a concept included in a cyclone in a wide sense. The cyclone is divided into an axial inlet type and a tangential inlet type according to the inflow structure of air. In case of the axial inlet type cyclone, air is introduced along an axial direction of the cyclone, and in case of the tangential inlet type cyclone, air is introduced along a tangential direction of the cyclone.

The axial inlet type cyclone is divided into a cone type and a tube type according to the structure. The cone type has a structure in which the inner diameter gradually decreases in size, while the tube type has a structure in which the inner diameter is constant in size.

The cone type may have only a reverse flow structure, while the tube type may selectively have either one of a reverse direction and a forward flow structure. The reverse flow structure refers to a structure in which an inlet of air and an outlet of air are open in the same direction in such a manner that air introduced into the inlet of air reverses the flow direction and is discharged to the outlet of air. In contrast, the forward flow structure refers to a structure in which the inlet of air and the outlet of air are open in directions opposite to each other, and air introduced into the inlet of air is discharged to the outlet of air while maintaining the flow direction.

The axial inlet type swirl tube 160a of the present disclosure corresponds to an axial inlet type and a tube type, and has a forward flow structure. The axial inlet type swirl tube 160a is supplied with air and fine dust that have passed through the cyclone 150 and the mesh 170. Furthermore, the axial inlet type swirl tube causes a swirling flow to separate the fine dust from the air.

The axial inlet type swirl tube 160a receives the air (A) and the fine dust (F) along an axial direction. The axial direction refers to a direction extending toward the inlet (I) and the outlets (O1, O2) of the axial inlet type swirl tube 160a. When the air and the fine dust are supplied along an axial direction, the flow may be uniformly and symmetrically formed at 360° (degrees), thereby preventing the occurrence of a phenomenon of concentration of the flow in one region.

The axial inlet type swirl tube 160a includes a body 161a, a vortex finder 161b, a vane 161c, and an outlet partition portion (or outlet partition) 162a. The body 161a forms an appearance of the axial inlet type swirl tube 160a and forms a boundary between an inner side and an outer side of the axial inlet type swirl tube 160a. The body 161a is formed in a hollow cylindrical shape, and an inner diameter of the body 161a is constant. One side (an upper side or inlet side)) 161a1 and the other side (lower side or outlet side) 161a2 of the body 161a are open. Referring to FIG. 4, the open upper portion 161a1 corresponds to the inlet (I) of the body 161a and the open lower portion 161a2 corresponds to the outlets (O1, O2) of the body 161a. Therefore, the inlet (I) and the outlets (O1, O2) of the body 161a are open toward directions opposite to each other.

A vortex finder 161b is provided on an inlet side 161a1 of the body 161a. The vortex finder 161b includes a first portion (or first vortex finder surface) 161b1 and a second portion (or second vortex finder surface) 161b2. The first portion 161b1 is formed in a cylindrical shape. Furthermore, the second portion 161b2 protrudes from the first portion 161b1 toward the outlets (O1, O2) of the body 161a, and has a cone shape.

The second portion 161b2 of the axial inlet type swirl tube 160a is clogged to not open to pass an air flow. Therefore, air is not discharged to an inside of the vortex finder 161b. Since the air is not discharged to an inside of the vortex finder 161b, the air does not change the flow direction inside the body 161a.

The vane 161c is formed between an outer circumferential surface of the first portion 161b1 and an inner circumferential surface of the body 161a. There may be provided with a plurality of vanes 161*c*, and the plurality of vanes 161*c* extend in a spiral direction. The vortex finder 161*b* and the vane 161*c* form a swirling flow of air and fine dust between an outer circumferential surface of the vortex finder 161*b* and an inner circumferential surface of the body 161*a*.

The outlets (O1, O2) of the axial inlet type swirl tube 160*a* include an air outlet (O1) and a fine dust outlet (O2). The air outlet (O1) and the fine dust outlet (O2) are open toward the same direction (the outlet side 161*a*2 of the body 161*a*). The outlet partition portion 162*a* is provided on the outlet side 161*a*2 of the body 161*a* and formed to partition the air outlet (O1) and the fine dust outlet (O2).

Referring to FIG. 4, the fine dust outlet (O2) is formed in a ring shape around the air outlet (O1). An inner region defined by the outlet partition portion 162*a* corresponds to the air outlet (O1). Furthermore, a region between an outer circumferential surface of the outlet partition portion 162*a* and an inner circumferential surface of the body 161*a* corresponds to the fine dust outlet (O2). The outlet partition portion 162*a* is formed in a cylindrical shape and defines the air outlet (O1) and the fine dust outlet (O2).

Referring to FIG. 4, the body 161*a* and the vortex finder 161*b* may be connected to each other by a vane 161*c*. Therefore, the body 161*a*, the vortex finder 161*b*, and the vane 161*c* may be formed by one member, and this one member may be referred to as a first member 161. On the other hand, the outlet partitioning portion 162*a* is spaced apart from the body 161*a*. Therefore, the outlet partition portion 162*a* is formed by a separate member, and the separate member may be referred to as a second member 162. The axial inlet type swirl tubes 160 are formed by an engagement of the first member 161 and the second member 162.

Figure 5:
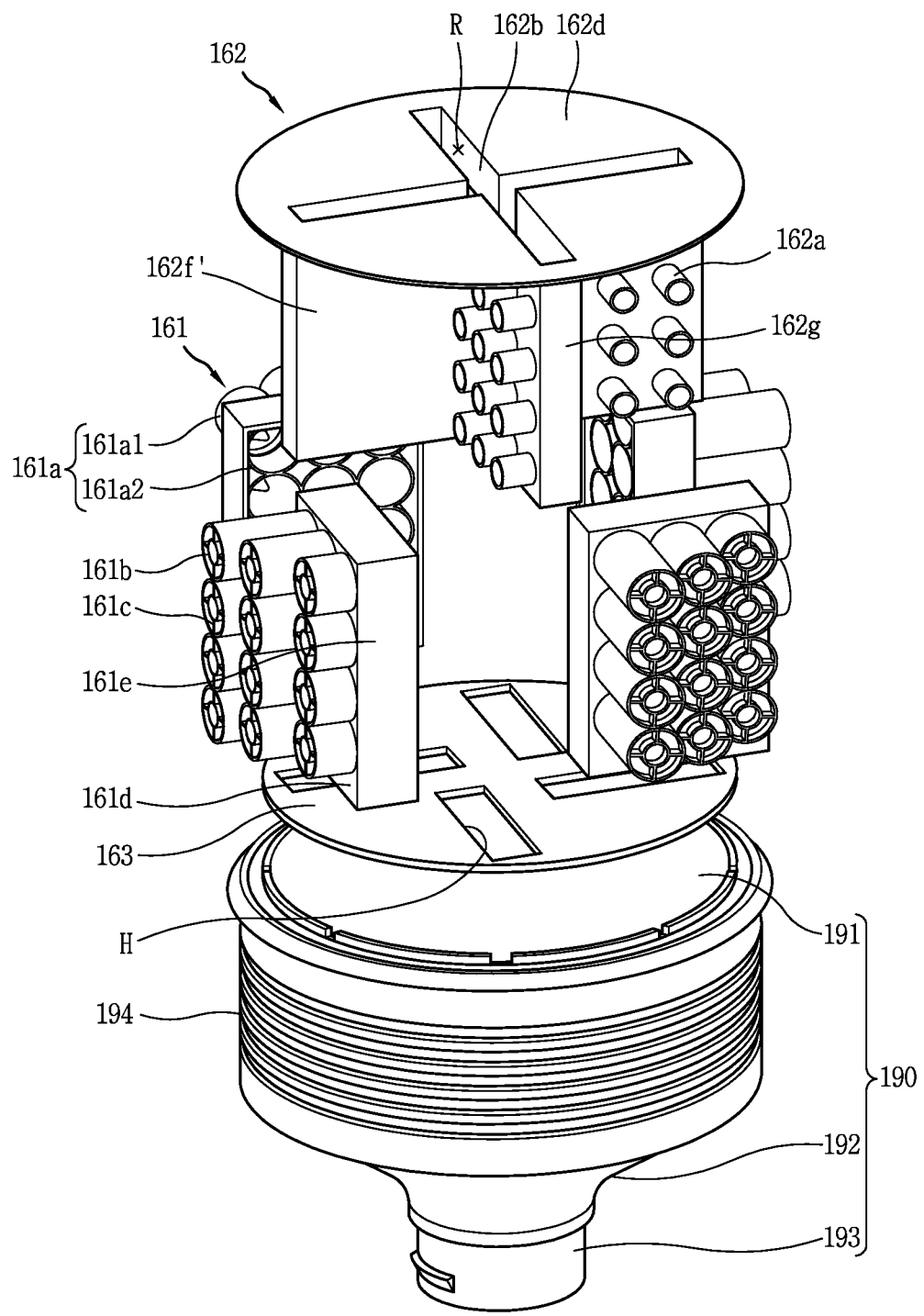
FIG. 5 is an exploded perspective view illustrating an internal structure of the dust collector illustrated in FIG. 2.

Hereinafter, a coupling structure of the first member 161 and the second member 162 will be described. FIG. 5 is an exploded perspective view illustrating an internal structure of the dust collector 100 illustrated in FIG. 2. The dust collector 100 includes a plurality of axial inlet type swirl tubes 160. The axial inlet type swirl tubes 160 may be formed by a coupling between the first member 161 and the second member 162. There may be provided with a plurality of first members 161, and there may be provided with a single second member 162.

The first member 161 includes a curved or planar body base 161*d*. The body 161*a* of the axial inlet type swirl tube protrudes to both sides of the body base 161*d*. The inlet side 161*a*1 of the body 161*a* protrudes from one side of the body base 161*d* and the outlet side 161*a*2 of the body 161*a* protrudes from the other side of the body base 161*d*. The inlet side 161*a*1 and the outlet side 161*a*2 of the body 161*a* are divided based on the body base 161*d*.

One body base 161*d* and a plurality of bodies 161*a* may be formed for each first member 161. Furthermore, a plurality of bodies 161*a* may be stacked in multiple stages (or rows extending in a horizontal direction) for each first member 161, and a plurality of bodies 161*a* may be formed for each stage. In FIG. 5, it is shown that the bodies 161*a* are stacked in four stages for each first member 161, and three bodies 161*a* are formed for each stage. Similarly, the plurality of bodies 161*a* may be provided in multiple columns (e.g., extending in a height direction) for each first member 161. In FIG. 5, it is shown that the bodies 161*a* are grouped in three columns for each first member 161.

The appearance of each axial inlet type swirl tube 160 is formed by each body 161*a*. Since the bodies 161*a* are stacked in multiple stages on a virtual quadrant, the axial inlet type swirl tube 160 also are stacked in multiple stages on a virtual quadrant.

The bodies 161*a* provided in each stage have different axial lengths. The axial length denotes a distance between an end portion of the inlet side 161*a*1 of the body and an end portion of the outlet side 161*a*2 thereof. Referring to FIG. 5, it can be seen that the axial length of the body 161*a* increases toward any one side. Any one side denotes a direction approaching the center of the housing 110 or a direction in which a rising flow path (R) to be described later is formed.

The length of the body 161*a* has an effect on the separation performance of the axial inlet type swirl tube 160. As the length of the body 161*a* increases, the separation performance of the axial inlet type swirl tube 160 increases. Therefore, it is preferable to have an increased length of the body 161*a*.

However, since the size and shape of the housing 110 are limited, the length of the body 161*a* cannot be infinitely increased. In particular, since the shape of the housing 110 is cylindrical, the axial length of the body 161*a* may be gradually increased as it approaches the center of the housing 110.

The occurrence of a dead zone in the housing 110 may be suppressed when the length of the body 161*a* gradually increases as it approaches the axial inlet type swirl tube 160 provided at the center of each stage. In addition, the separation performance of the axial inlet type swirl tube 160 may be maximized within a limited size and shape of the housing 110. Here, the dead zone denotes a wasted space that does not contribute to improving the separation performance of the axial inlet type swirl tube 160 through an increase in the axial length of the body 161*a*.

The vortex finder 161*b* and the vane 161*c* are formed on an inner side of each body 161*a*. The vortex finder 161*b* and the vane 161*c* are formed on an inlet side 161*a*1 of the body 161*a*. The vane 161*c* is formed between an outer circumferential surface of the vortex finder 161*b* and an inner circumferential surface of the body 161*a*.

The first member 161 includes a rim portion (or rim surface) 161*e*. The rim portion 161*e* extends from a rim of the body base 161*d* toward the outlet side 161*a*2 to surround the outlet side 161*a*2 of the bodies 161*a*. It can be understood that the body base 161*d* corresponds to any one side of a square pillar and the rim portion 161*e* corresponds to any two sides and an upper surface of the rectangular pillar.

When the first member 161 is coupled to the second member 162, the rim portion 161*e* is brought into close contact with the outlet base (or outlet base surface) 162*b* to seal the remaining rim except a lower portion of the outlet base 162*b*. The lower portion of the outlet base 162*b* should be open since a falling flow path of fine dust discharged from the axial inlet type swirl tube 160 should be formed. In such a case, fine dust may fall to the second dust collection unit 142.

Conversely, the remaining rim except for the lower portion of the outlet base 161*b* should be sealed. If the remaining rim is not sealed, then there is a concern that fine dust discharged from the axial inlet type swirl tube 160 may flow into an inlet of the axial inlet type swirl tube 160 again.

Four first members 161 may be provided therein. The four first members 161 may have the same shape. When a cross-shaped rising flow path (R) to be described later is a coordinate axis of the quadrant, the first members 161 may be provided one by one on the first through fourth quadrant, respectively. The first members 161 provided one by one in each quadrant may be arranged to face different directions.

For example, the first member provided in a first quadrant may be arranged to face the 3 o'clock direction, the first member provided in a second quadrant to face the 12 o'clock direction, the first member provided in a third quadrant to face the 9 o'clock direction, and the first member provided at a fourth quadrant to face at the 6 o'clock direction. Each first member may be arranged to form an angle of 90 degrees with another adjacent first member.

The body 161a determines the layout and arrangement of the axial inlet type swirl tube 160. The axial inlet type swirl tubes provided in the same quadrant are arranged to face the same direction, and the axial inlet type swirl tubes arranged in different quadrants are arranged to face different directions.

For example, the axial inlet type swirl tubes provided in the first quadrant may be referred to as a first group, the axial inlet type swirl tubes provided in the second quadrant as a second group, the axial inlet type swirl tubes provided in the third quadrant as a third group, and the axial inlet type swirl tubes provided in the fourth quadrant as a fourth group. In this case, the axial inlet type swirl tubes belonging to the same group are arranged to face the same direction. On the contrary, the axial inlet type swirl tubes belonging to different groups are arranged to face different directions.

The second member 162 includes an outlet base (or outlet base surface) 162b, an air vent hole 162c, an outlet partition portion (or outlet partition) 162a, an upper block portion (or upper block surface) 162d, a sidewall 162f, and a connecting wall 162g.

At the center of the second member 162, a rising flow path (R) of air discharged from the axial inlet type swirl tubes 160 is formed. The rising flow path (R) communicates with the exhaust guide 124 formed in the upper cover 120 and the outlet 123 of the dust collector 100. Accordingly, air discharged from the axial inlet type swirl tubes 160 is discharged to an outside of the dust collector 100 through the rising flow path (R), the exhaust guide 124 and the outlet 123.

The rising flow path (R) has a cross-shaped cross section corresponding to the coordinate axis of the quadrant. Furthermore, the outlet base 162b, the sidewall 162f, and the connecting wall 162g form an outer wall of the rising flow path (R). It can be understood that the outlet base 162b, the sidewall 162f and the connecting wall 162g correspond to the sides of a cross pillar since the rising flow path (R) has a cross-shaped cross section.

The outlet base 162b has a curved surface or a flat surface. The outlet base 162b is provided to face the outlet side 161a2 of the body 161a at a position spaced from the outlet side 161a2 of the body 161a. The outlet base 162b of the second member 162 is provided in the same number as that of a group of axial inlet type swirl tubes 160. For example, FIG. 5 illustrates a configuration in which four outlet bases 162b are provided so as to correspond to four groups of axial inlet type swirl tubes 160.

Each outlet base 162b is provided one by one for each quadrant. The outlet bases of the first group are provided in the first quadrant, the outlet bases of the second group in the second quadrant, the outlet bases of the third group in the third quadrant, and the outlet bases of the fourth group in the fourth quadrant. The outlet bases 162b forming the first through fourth groups of axial inlet type swirl tubes are arranged to face different directions.

The sidewall 162f is provided to face the outlet base 162b at a position spaced apart by interposing the coordinate axis of the quadrant therebetween. Four sidewalls 162f are provided to correspond to the outlet bases 162b, and one sidewall 162f is provided for each quadrant.

The sidewall provided in the first quadrant faces the outlet base provided in the fourth quadrant. The sidewall provided in the second quadrant faces the outlet base provided in the first quadrant. The sidewall provided in the third quadrant faces the outlet base provided in the second quadrant. The sidewall provided in the fourth quadrant faces the outlet base provided in the third quadrant.

The connecting wall 162g crosses the coordinate axes of the quadrants to connect an outer edge of the sidewall 162f and an outer edge of the outlet base 162b facing each other. The two sidewalls cross the X axis and the other two sidewalls cross the Y axis. Thus, the sidewall 162f, the outlet base 162b, and the connecting wall 162g are sequentially connected. The rising flow path (R) of air is formed in a region defined by the sidewall 162f, the outlet base 162b and the connecting wall 162g.

The air outlet holes 162c are formed in each outlet base 162b. The air vent holes 162c are formed in the same number as that of the axial inlet type swirl tubes 160. Furthermore, the air vent holes 162c have the same arrangement as that of the bodies 161a. For example, the air vent holes 162c may be stacked in multiple stages, and a plurality of air vent holes 162c may be formed in each stage.

The outlet partition portion 162a protrudes from the circumference of each air vent hole 162c toward an inside of the body 161a. Since the air vent hole 162c is formed in the outlet base 162b, it may be understood that the outlet partition portion 162a protrudes from the outlet base 162b. The outlet compartments 162a have the same arrangement as that of the bodies 161a similarly to the air vent holes 162c. In FIG. 5, it is shown that the outlet partition portions 162a are stacked in four stages for each quadrant, and three outlet partition portions 162a are formed for each stage.

The upper block portion 162d may be formed at an upper end of the rising flow path (R). Referring to FIG. 5, it can be seen that the upper block portion 162d formed at an upper end of the rising flow path (R) has a circular rim. The upper block portion 162d blocks the remaining region except for the rising flow path (R).

The second dust collection unit top cover (or second dust collection chamber top cover) 163 is provided at a bottom side of the first member 161 and the second member 162. The axial inlet type swirl tubes 160 are formed by a coupling between the first member 161 and the second member 162, and thus it can be understood that the second dust collection unit top cover 63 is provided at a lower side of the axial inlet type swirl tubes 160. The second dust collection unit top cover 163 has a circular shape. When the second dust collection unit top cover 163 is inserted into a support member 190 which will be described later, the second dust collection unit top cover 163 comes into contact with the support member 190 along an inner circumferential surface of the support member 190. The second dust collection unit top cover 163 partitions an inlet side of the axial inlet type swirl tubes 160 from the second dust collection unit 142 and prevents scattering of fine dust collected in the second dust collection unit 142.

A hole (H) for falling fine dust discharged from the fine dust outlet (O2) (see FIG. 7) of the axial inlet type swirl tubes 160 is formed on the second dust collection unit top covers 163. The air and the fine dust introduced into the axial inlet type swirl tubes 160 are swirled inside the axial inlet type swirl tubes 160, and separated from each other. The air is discharged through the air outlet (O1) (see FIG. 7), and the fine dust is discharged through the fine dust outlet (O2). The fine dust discharged through the fine dust outlet (O2) falls through the hole (H) to be collected in the second dust collection unit 142.

Holes (H) for falling fine dust are formed below the outlet side 161a2 of the bodies 161a. Four holes (H) for falling fine dust are formed. Each hole (H) is formed in a different quadrant.

The axial inlet type swirl tubes 160 are formed by a coupling between four first members 161 and one second member 162 corresponding to the first through fourth groups. When the four first members 161 are coupled to the second member 162, the axial inlet type swirl tubes 160 are formed. The four first members 161 are coupled to the second member 162 in different directions.

The axial inlet type swirl tubes 160 may be supported by a support member 190. The support member 190 may be formed to receive a lower end of the axial inlet type swirl tubes 160. The support member 190 includes a receiving portion (or receiving surface) 191, an inclined portion (or inclined surface) 192, and a dust collecting guide (or dust collecting guide surface) 193. A sealing member (or seal) 194 may be coupled to an outer circumferential surface of the support member 190. Each configuration of the support member 190 will be described later with reference to FIG. 6.

Figure 6:
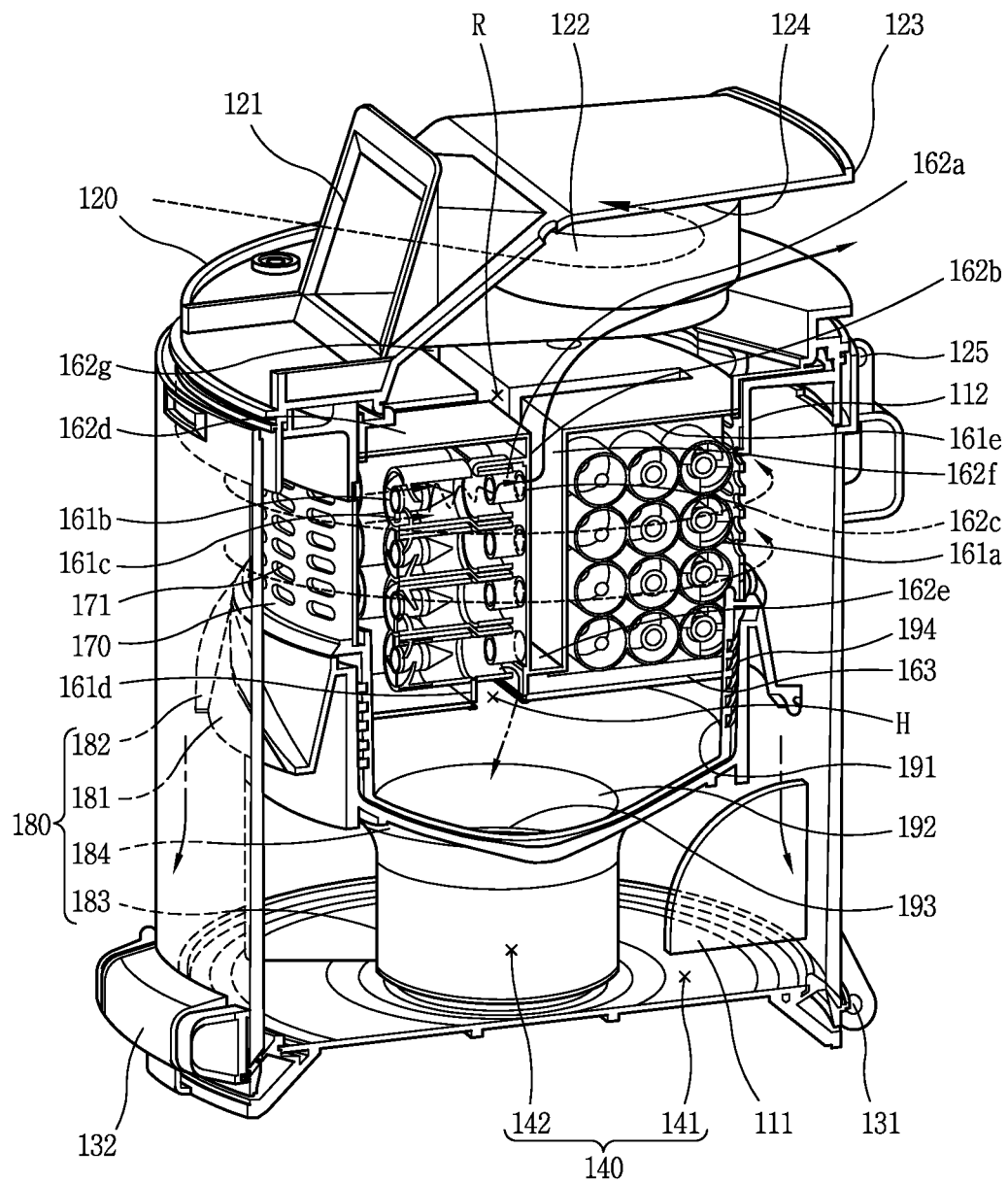
FIG. 6 is a cross-sectional view in which the dust collector illustrated in FIG. 2 is cut along line A-A and seen from one side.

FIG. 6 is a cross-sectional view in which the dust collector 100 illustrated in FIG. 2 is cut along line A-A and seen from one side. When the four first members 161 are coupled to the second member 162 in different directions, at least part of each of the outlet partition portions 162a protruding from the outlet base 162b is inserted into an outlet side of each body 161a. As a result, the axial inlet type swirl tubes 160 are formed. The axial inlet type swirl tubes 160 are stacked in multiple stages.

The second member 162 further includes a lower block portion (or lower block surface) 162e. The lower block portion 162e is formed at a lower end of the outlet base 162b, the sidewall 162f, and the connecting wall 162g. When the outlet base 162b, the sidewall 162f, and the connecting wall 162g of the second member 162 correspond to the sides of a polygonal pillar, the lower block portion 162e corresponds to a bottom side of the polygonal pillar. An upper surface of the polygonal pillar is open to discharge air through the rising flow path (R).

The lower block portion 162e partitions the rising flow path (R) and the second dust collection unit 142 to block a suction force generated by the suction motor from reaching fine dust collected in the second dust collection unit 142. Accordingly, the lower block portion 162e prevents the fine dust collected in the second dust collection portion 142 from being scattered to the rising flow path (R) of the air.

If there is no lower block portion 162e, fine dust discharged from the fine dust outlet (O2) of the axial inlet type swirl tubes 160 is moved upward along the rising flow path (R) without being collected by the second dust collection unit 142 to be mixed with the air again.

The upper block portion 162d extends toward a circumferential direction from an upper end of the outlet base 162b, an upper end of the sidewall 162f, and an upper end of the connecting wall 162g. Since the fine dust outlet (O2) of each axial inlet type swirl tube is formed around the air outlet (O1), the fine dust is discharged through the circumference of the air outlet (O1). However, a remaining region excluding the fine dust falling flow paths (D1, D2) which will be described later is blocked by the outlet base 162b, the sidewall 162f, and the upper block portion 162d. Accordingly, the upper block portion 162d prevents the mixing of fine dust and air discharged from the axial inlet type swirl tubes 160.

Referring to FIG. 6, a mesh 170 is provided in an inner region of the housing 110. The mesh 170 surrounds an outside of the axial inlet type swirl tubes 160 to form a boundary between the cyclone 150 and the axial inlet type swirl tubes 160. The first through fourth groups of axial inlet type swirl tubes 160 are provided in an inner region of the mesh 170. Furthermore, a rising flow path (R) of air is formed in a region surrounded by the first through fourth groups of axial inlet type swirl tubes 160.

In order to support the mesh 170, the dust collector 100 may further include a mesh support portion 112. The mesh support portion 112 has a circumference corresponding to a circumference of the mesh 170, and is formed to surround an upper rim of the mesh 170. The mesh support portion 112 may be formed integrally with the housing 110, but is not necessarily limited thereto.

The upper block portion 162d of the second member 162 described above is provided around the rising flow path (R) to have a circular outer rim. Accordingly, the upper block portion 162d may be brought into close contact with an inner circumferential surface of the mesh support portion 112. Therefore, the upper block portion 162d partitions the exhaust guide 124, which is a downstream side of the rising flow path (R), and the inlet (I) (see FIG. 7) of the axial inlet type swirl tube 160. The upper block portion 162d may prevent the mutual mixing of air discharged to the exhaust guide 124 through the rising flow path (R) and air introduced into the axial swirl tubes 160.

A pre-filter (not shown) may be provided at an upper end of the upper block portion 162d. The pre-filter may be formed to filter ultra-fine dust from the air discharged through the rising flow path (R). The pre-filter is referred to as a pre-filter because it is provided at an upstream side of the suction motor on the basis of the flow of air.

Hereinafter, the process of separating air and foreign matter will be described. The air and the foreign matter are sequentially passed through the suction nozzle 20 and the connecting unit 30 by a suction force generated by the suction motor of the vacuum cleaner 1, and introduced into the dust collector 100 through the inlet of the dust collector 100.

The air introduced into the dust collector 100 swirls inside the housing 110. A centrifugal force of dust that is heavier than air is larger than that of the air. Accordingly, the dust swirls along an inner circumferential surface of the housing 110 and then the dust falls and is collected in the first dust collection unit 141.

The air flows through the mesh 170 into the axial inlet type swirl tubes 160 and swirls inside the body 161a by the guide vanes 161c. A centrifugal force of fine dust that is heavier than air is larger than that of the air. Therefore, the fine dust swirls along an inner circumferential surface of the body 161a, and then is discharged to the fine dust outlet (O2), and falls along the fine dust falling flow paths D1, D2 (see FIG. 7), and is collected in the second dust collection portion 142. The air is discharged to the air outlet (O1) and then discharged to an outside of the dust collector 100 while sequentially passing through the rising flow path (R), the exhaust guide 124 and the outlet 123 of the dust collector 100.

The support member 190 includes a receiving portion 191, an inclined portion 192, and a dust collecting guide 193. The receiving portion 191 corresponds to an uppermost portion of the support member 190 and the dust collecting guide 193 corresponds to the lowermost portion of the support member 190. The inclined portion 192 is formed between the receiving portion 191 and the dust collecting guide 193. The receiving portion 191 and the dust collecting guide 193 are formed in a cylindrical shape, and the receiving portion 191 has a larger cross-sectional area than the dust collecting guide 193.

The receiving portion 191 is formed so as to surround a lower end of the axial inlet type swirl tubes 160. However, an inner circumferential surface of the receiving portion 191 must be spaced from the inlet (I) of the axial inlet type swirl tubes 160 so as not to block a flow path of the air and the fine dust flowing into the axial inlet type swirl tubes 160. The second dust collection unit top cover 163 is brought into close contact with an inner circumferential surface of the receiving portion 191.

The inclined portion 192 is formed in an inclined manner such that the cross-sectional area gradually decreases toward the bottom of the support member 190. Accordingly, the fine dust discharged from the axial inlet type swirl tubes 160 flows down smoothly along the inclined portion 192.

The dust collecting guide 193 protrudes from the inclined portion 192 toward the lower cover 130, and is inserted into the dust collection unit boundary 183. Accordingly, the fine dust discharged from the axial inlet type swirl tubes 160 is guided to the second dust collection unit 142 by the dust collecting guide 193.

The mesh 170 may be mounted at an upper end of the inner housing 180. The inner housing 180 is formed to surround the support member 190. The foregoing skirt 181 is formed at an upper portion of the inner housing 180. Furthermore, the dust collecting boundary 183 is formed at a lower portion of the inner housing 180. The dust collection unit boundary 183 is brought into close contact with the lower cover 130 to partition the dust collection unit 140 into a first dust collection unit 141 and a second dust collection unit 142. A mounting portion 184 for mounting the support member 190 is formed between the skirt 181 and the dust collection unit boundary 183. The mounting portion 184 may be formed to be inclined in the same manner as the inclined portion 192 of the support member 190.

A ring-shaped sealing member 194 may be provided between an inner circumferential surface of the inner housing 180 and an outer circumferential surface of the support member 190. A plurality of sealing members 194 may be provided. When the support member 190 is inserted into the inner housing 180, the sealing member 194 seals between the inner housing 180 and the support member 190. Accordingly, it may be possible to prevent the leakage of fine dust collected in the second dust collection unit 142.

Figure 7:
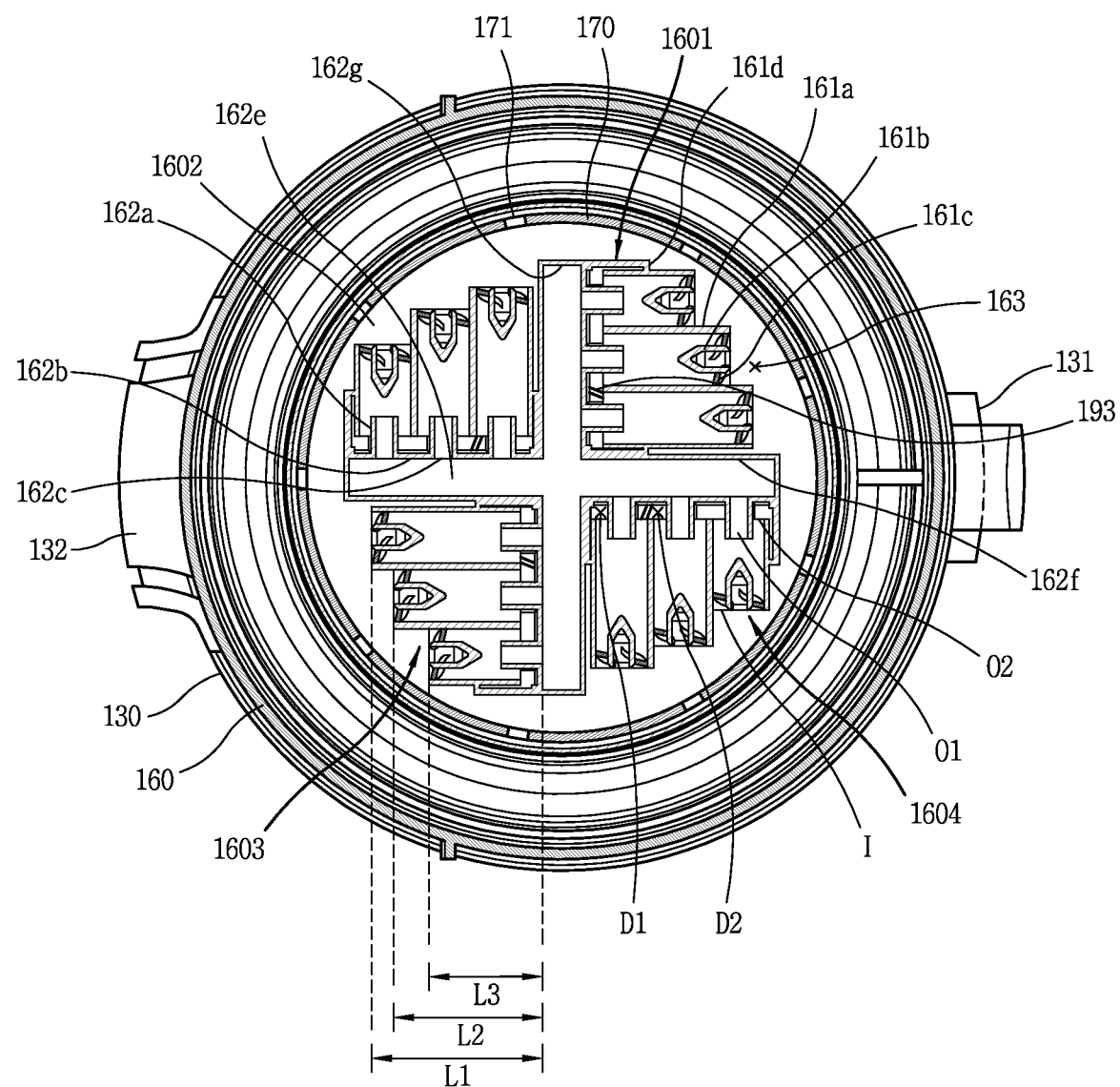
FIG. 7 is a cross-sectional view in which the dust collector illustrated in FIG. 2 is cut along line B-B and seen from the top.

FIG. 7 is a cross-sectional view in which the dust collector 100 illustrated in FIG. 2 is cut along line B-B and seen from the top. The axial inlet type swirl tubes of each group are provided in a region defined by the mesh 170, the outlet base 162b and the sidewall 162f. The region defined by the mesh 170, the outlet base 162b, and the sidewall 162f refers to virtual first through fourth quadrants.

A first group 1601 of axial inlet type cyclones are provided in the first quadrant, a second group 1602 of axial inlet type cyclones in the second quadrant, a third group 1603 of axial inlet type cyclones in the third quadrant, and a fourth group 1604 of axial inlet type cyclones in the fourth quadrant.

An axial length of the axial inlet type swirl tube arranged in each group gradually increases as it approaches the sidewall 162f. Referring to FIG. 7, the axial length of the axial inlet type swirl tube provided at the farthest position from the sidewall is L3, and the axial length of the axial inlet type swirl tube provided at the closest position to the sidewall 162f is L1. In addition, the axial length of the axial inlet type swirl tube provided in the middle is L2. In FIG. 7, it can be seen that L1>L2>L3. It has been described above that the occurrence of a dead zone can be suppressed through such a structure.

The axial inlet type swirl tubes provided in the same quadrant are arranged to face the same direction. It denotes that the axial inlet type swirl tubes belonging to the same group are arranged to face the same direction. On the contrary, the axial inlet type swirl tubes belonging to different quadrants are arranged to face different directions. It denotes that the axial inlet type swirl tubes belonging to different groups are arranged to face different directions.

The axial inlet type swirl tubes 160 are stacked in multiple stages. Furthermore, the outlet of each of the axial inlet type swirl tubes 160 is arranged to face the rising flow path (R).

An end portion of the outlet side 161a2 of the body 161a and the outlet base 162b are spaced from each other to form fine dust falling flow paths D1, D2 communicating with the second dust collection unit 142 therebetween. Since each end of the axial inlet type swirl tubes 160 has the same structure, the fine dust falling flow paths D1, D2 extend downward toward the second dust collection unit 142.

The end portions of the outlet sides 161a2 of two bodies 161a provided adjacent to each other are arranged to be in contact with each other. An end portion of the respective outlet sides 161a2 of the two bodies 161a in contact with each other and the outlet base 162b are spaced from each other to form fine dust falling flow paths D1, D2 therebetween. Accordingly, the air outlet (O1) and the fine dust falling flow paths D1, D2 are alternately formed along the outlet base 162b.

As a number of the swirl inlet type swirl tubes 160 increases, and a length thereof increases, the separation performance for separating fine dust from air is improved, and therefore, it is preferable that the number of the axial inlet type swirl tubes 160 is large and the length thereof is long. However, since the number and length of the axial inlet type swirl tubes 160 cannot be increased indefinitely within a limited space, the number and length of the axial inlet type swirl tubes 160 must be maximized through an efficient arrangement thereof.

As illustrated in FIG. 7, when the axial inlet type swirl tubes 160 are stacked in multiple stages, the number of the axial inlet type swirl tubes 160 may be increased. In addition, when an axial length of each of the axial inlet type swirl tubes 160 is not constant and increases in proportion to a distance from the outlet of each of the axial inlet type swirl tubes to the housing 110, an average length of the axial inlet type swirl tubes 160 may further increase.

Furthermore, in order to suppress the flow loss (pressure loss) of air, a flow direction change of the air must be minimized. The pressure loss of the air has an effect on the performance of the dust collector 100. As illustrated in FIG. 7, when the axial inlet type swirl tubes 160 are arranged at the same height and the inlet of each axial inlet type swirl tube faces the mesh 170, air that has passed through the cyclone 150 and the mesh 170 is directly introduced into the axial inlet type swirl tube without changing the flow direction.

In addition, since the axial inlet type swirl tube has the inlet and the outlet formed opposite to each other, unlike the cyclone 150, air introduced through the inlet of the axial inlet type swirl tube is directly discharged to the outlet without changing the flow direction. Therefore, the pressure loss of the air may be suppressed through the structure and arrangement of the axial inlet type swirl tube.

The configurations and methods according to the above-described embodiments will not be limited to the foregoing dust collector and cleaner, and all or part of each embodiment may be selectively combined and configured to make various modifications thereto.

According to the present disclosure having the foregoing configuration, the axial inlet type swirl tube has a forward direct inlet structure and a forward direct outlet structure. For example, since the inlet of the axial inlet type cyclone is provided to face the mesh, air passing through the mesh immediately flows into the inlet of the axial inlet type swirl tube without changing the flow direction. Furthermore, since the inlet and the outlet of the axial inlet type swirl tube are formed on opposite sides to each other, air introduced through the inlet is discharged through the outlet without changing the flow direction.

The flow direction of the air does not change during the process of being introduced into and discharged from the axial inlet type swirl tube, and thus when using the structure and arrangement of the axial inlet type swirl tube proposed in the present disclosure, it may be possible to suppress the flow loss (pressure loss) of the air and improve the performance of the dust collector.

Furthermore, according to the present disclosure, since the axial inlet type swirl tubes are stacked in multiple stages, the number of the axial inlet type swirl tubes may be increased within a limited space. In particular, the axial inlet type swirl tube is advantageous for downsizing compared to the cyclone. Accordingly, an increase in the number of the multi-stage arrangements of the axial inlet type swirl tubes improves the separation performance of separating fine dust from air.

In addition, according to the present disclosure, the expansion of a space occupied by the axial inlet type swirl tubes may be suppressed through an optimal arrangement of the axial inlet type swirl tubes, thereby increasing the capacity of the dust collection unit for collecting dust.

An aspect of the present disclosure is to provide a cleaner having a structure capable of suppressing the flow loss of air by using a high-efficiency axial inlet type swirl tube. Another aspect of the present disclosure is to propose a structure capable of maximizing an efficiency of the axial inlet type swirl tube through an optimal arrangement of the axial inlet type swirl tube. In particular, the present disclosure presents a structure of optimizing an arrangement and the like capable of improving the flow direction of air introduced into or discharged from the axial inlet type swirl tube, and increasing a number of the axial inlet type swirl tubes.

In order to accomplish the foregoing aspects of the present disclosure, a dust collector according to an embodiment of the present disclosure may include an axial inlet type swirl tube provided at a downstream side of a cyclone. The axial inlet type swirl tubes are configured with four groups and stacked in multiple stages on a virtual quadrant, the axial inlet type swirl tubes arranged in the same quadrant are arranged to face the same direction, and the axial inlet type swirl tubes arranged in different quadrants are arranged to face different directions.

The dust collector may include a cylindrical housing configured to form an outer appearance of the dust collector; a cyclone formed inside the housing to cause a swirling flow to separate dust from air introduced into the housing; and a mesh configured to surround an outside of the axial inlet type swirl tubes to form a boundary between the cyclone and the axial inlet type swirl tubes. The axial inlet type swirl tubes may receive air and fine dust that have passed through the cyclone, and cause a swirling flow to separate the fine dust from the air.

Each of the axial inlet type swirl tubes may be provided toward the mesh, and may include an inlet configured to receive air and fine dust; an air outlet and a fine dust outlet that are open toward the same direction, and the inlet may be open toward a direction opposite to the air outlet and the fine dust outlet. The fine dust outlet may be formed in a ring shape around the air outlet.

Each of the axial inlet type swirl tubes may include a cylindrical body; a vortex finder provided on an inlet side of the body, and provided with a cylindrically shaped first portion and a cone shaped second portion protruded from the first portion toward an outlet side of the body; a vane formed between an outer circumferential surface of the first portion and an inner circumferential surface of the body, and extended in a spiral direction; and an outlet partition portion provided at an outlet side of the body, and formed in a cylindrical shape to partition the air outlet and the fine dust outlet formed around the air outlet.

The axial inlet type swirl tubes may be formed by a coupling between a first member and a second member, and the first member may form the body, the vortex finder and the vane of each axial inlet type swirl tube, and the second member may form the outlet partition portion of each axial inlet type swirl tube, and at least part of the outlet partition portion may be inserted into an outlet side of the body.

The first member further may include a curved or planar body base, and the body may be protruded to both sides of the body base, and the second member may further include an outlet base having a curved or planar shape, and the outlet base may be formed with a number of air vent holes corresponding to the axial inlet type swirl tubes, and the outlet partition portion may be protruded from a circumference of the air vent hole toward an inside of the body.

The body may be divided into an inlet side and an outlet side based on the body base, and the first member may further include a rim portion extended from the body base toward the outlet side direction to surround the outlet side of the body. When the first member is coupled to the second member, the rim portion may be brought into close contact with the outlet base to seal a remaining rim except for a lower portion of the outlet base.

A rising flow path of air discharged from the axial inlet type swirl tubes may be formed at the center of the second member, and the rising flow path may have a cross-shaped cross section corresponding to a coordinate axis of the quadrant, and communicate with an outlet of the dust collector formed at an upper side of the housing.

The axial inlet type swirl tubes may include a first group provided in a first quadrant of the quadrants; a second group provided in a second quadrant of the quadrants; a third group provided in a third quadrant of the quadrants; and a fourth group provided in a fourth quadrant of the quadrants, wherein each of the axial inlet type swirl tubes is formed by a coupling between four first members corresponding to the first through fourth groups and one second member, and the outlet bases of the first through fourth groups are provided in different quadrants, and arranged to face different directions.

The four first members may be coupled to the second member in different directions. The mesh may be provided in an inner region of the housing, and the first through fourth groups of axial inlet type swirl tubes may be provided in an inner region of the mesh, and the rising flow path may be formed in a region surrounded by the first through fourth groups of axial inlet type swirl tubes.

The second member may further include four sidewalls respectively provided to face the first through fourth groups of outlet bases at a position spaced apart by interposing a coordinate axis of the quadrant therebetween; and four connecting walls crossing a coordinate axis of the quadrant to connect an outer side of the sidewall to an outer side of the outlet base facing each other, wherein the four outlet bases, the four sidewalls, and the four connecting walls are sequentially connected to form a cross-shaped rising flow path.

The axial inlet type swirl tubes of each group may be provided in a region defined by the mesh, the outlet bases and the sidewalls, and an axial length of the axial inlet type swirl tube provided in each group may be gradually increased as it approaches the sidewall.

The dust collector may further include a first dust collection unit formed in a ring shape inside the housing and formed to collect dust falling from the cyclone; and a second dust collection unit formed in a region surrounded by the first dust collection unit, and formed to collect fine dust falling from the axial inlet type swirl tubes, wherein the second member further comprises a lower block portion for partitioning the second dust collection unit and the rising flow path to prevent fine dust collected in the second dust collection unit from being scattered to the rising flow path, and the lower block portion is formed at a lower end of the outlet base, the sidewall, and the connecting wall.

The dust collector may further include a mesh support portion formed to surround an upper rim of the mesh, and the second member may further include an upper block portion respectively formed at an upper end of the outlet base, and the upper block portion may have a circular outer rim to be brought into close contact with an inner circumferential surface of the mesh support portion, and partition an inlet of the axial inlet type swirl tubes and a downstream side of the rising flow path to prevent the mixing of air introduced into the axial inlet type swirl tubes and air discharged through the rising flow path.

The dust collector may further include a first dust collection unit formed in a ring shape inside the housing and formed to collect dust falling from the cyclone; a second dust collection unit formed in a region surrounded by the first dust collection unit, and formed to collect fine dust falling from the axial inlet type swirl tubes; and a second dust collection unit top cover provided below the axial inlet type swirl tubes to partition an inlet side of the axial inlet type swirl tubes and the second dust collection unit so as to prevent scattering of fine dust collected in the second dust collection unit, wherein four holes for falling fine dust discharged from the axial inlet type swirl tubes are formed in the second dust collection unit top cover, and the four holes are formed in different quadrants.

The dust collector may further include a first dust collection unit formed in a ring shape inside the housing and formed to collect dust falling from the cyclone; and a second dust collection unit formed in a region surrounded by the first dust collection unit, and formed to collect fine dust falling from the axial inlet type swirl tubes, wherein an end portion of the outlet side of the body and the outlet base are spaced apart from each other to form a fine dust falling flow path communicating with the second dust collection unit therebetween.

The air outlet and the fine dust falling flow path may be alternately formed along the outlet base. An axial length of each axial inlet type swirl tube may be proportional to a distance from the outlet of each axial inlet type swirl tube to the housing.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dust collector vacuum cleaner, comprising:
   a cylindrical housing configured to form an outer appearance of the vacuum cleaner;
   a cyclone provided inside the housing and configured to generate a first swirling flow to separate dust from air introduced into the housing;
   axial inlet type cyclones configured to receive air and fine dust that have passed through the cyclone, and generate second swirling flows to separate the fine dust from the received air; and
   a mesh configured to surround the axial inlet type cyclones and to form a boundary between the cyclone and the axial inlet type cyclones,
   wherein
      the axial inlet type cyclones are positioned in four groups in four respective quadrants within the housing,
      ones of the axial inlet type cyclones included in one of the four groups positioned in one of the quadrants are oriented to face a first direction, and
      ones of the axial inlet type cyclones included in other ones of the groups that are positioned in other ones of the quadrants are oriented to face other directions that differ from the first direction,
   wherein each of the axial inlet type cyclones includes:
      an inlet positioned to face the mesh and to receive air and fine dust; and
      an air outlet and a fine dust outlet that are open toward a same direction,
   wherein the inlet is open toward a direction that is opposite to that of the air outlet and the fine dust outlet, and
   wherein the air outlet is open toward a boundary of quadrants.

2. The vacuum cleaner of claim 1, wherein the fine dust outlet is formed in a ring shape around the air outlet.

3. The vacuum cleaner of claim 1, wherein each of the axial inlet type cyclones includes:
   a body having a cylindrical shape;
   a vortex finder provided on an inlet side of the body, and provided with a cylindrical first surface and a conical second surface protruded from the first surface toward an outlet side of the body;
   a vane formed between an outer circumferential surface of the first surface and an inner circumferential surface of the body, the vane extending in a spiral direction; and
   an outlet partition provided at the outlet side of the body, and formed in a cylindrical shape to partition the air outlet and the fine dust outlet formed around the air outlet.

4. The vacuum cleaner of claim 3, wherein
   the axial inlet type cyclones are formed by a coupling a first member and a second member,
   the first member forms the body, the vortex finder and the vane of each of the axial inlet type cyclones,
   the second member forms the outlet partition portion of each of the axial inlet type cyclones, and
   at least a portion of the outlet partition is inserted into the outlet side of the body.

5. The vacuum cleaner of claim 4, wherein
   the first member further includes a curved or planar body base,
   the body protrudes from both sides of the body base,
   the second member further includes an outlet base having a curved or planar surface,
   the outlet base includes a quantity of air vent holes corresponding to a quantity of the axial inlet type cyclones, and
   the outlet partitions protrude from circumferences of corresponding ones of the air vent holes and toward an inside of the body.

6. The vacuum cleaner of claim 5, wherein the body is divided into an inlet side and an outlet side based on the body base, and
   the first member further includes a rim surface extended from the body base toward the outlet side direction and around the outlet side of the body.

7. The vacuum cleaner of claim 6, wherein when the first member is coupled to the second member, the rim surface is positioned adjacent to the outlet base to seal a first portion of the rim surface and to define an opening at a second portion of the rim surface that is adjacent to a lower portion of the outlet base.

8. The vacuum cleaner of claim 5, wherein
   a rising flow path of air discharged from the axial inlet type cyclones is formed within the second member, and
   the rising flow path has a cross-shaped cross section corresponding to a coordinate axis of the quadrants, and communicates with an outlet of the vacuum cleaner formed at an upper side of the housing.

9. The vacuum cleaner of claim 8, wherein
   the axial inlet type cyclones include:
      a first one of the four groups provided in a first one of the quadrants;
      a second one of the four groups provided in a second one of the quadrants;
      a third one of the four groups provided in a third one of the quadrants; and
      a fourth one of the four groups provided in a fourth one of the quadrants, and
   each of the axial inlet type cyclones is formed by a coupling four first members corresponding to the four groups and the second member, and
   the outlet bases of the axial inlet type cyclones included in the four groups are provided in different quadrants, and to face four different directions.

10. The vacuum cleaner of claim 9, wherein the four first members are coupled to the second member in different directions.

11. The vacuum cleaner of claim 9, wherein
the mesh is provided in an inner region of the housing,
the four groups of the axial inlet type cyclones are provided within the mesh, and
the rising flow path is formed in a region surrounded by the four groups of the axial inlet type cyclones.

12. The vacuum cleaner of claim 9, wherein the second member further includes:
four sidewalls respectively provided to face the outlet bases of the four groups at positions the are spaced apart by interposing respective coordinate axis of the quadrants therebetween; and
four connecting walls crossing the coordinate axis of the quadrants to connect outer sides of the sidewalls to respective facing outer sides of the outlet bases, and
wherein the four outlet bases, the four sidewalls, and the four connecting walls are sequentially connected to form a cross-shaped rising flow path.

13. The vacuum cleaner of claim 12, wherein each of the groups of the axial inlet type cyclones are provided in a respective region defined by the mesh, the outlet bases and the sidewalls, and
axial lengths of ones the axial inlet type cyclone in each of the groups gradually increase toward the sidewall.

14. The vacuum cleaner of claim 12, further comprising:
a first dust collection chamber formed in a ring shape inside the housing and formed to collect the dust from the cyclone; and
a second dust collection chamber formed in a region surrounded by the first dust collection chamber, and configured to collect the fine dust from the axial inlet type cyclones, and
wherein the second member further comprises a lower block surface that partitions the second dust collection chamber and the rising flow path to block the fine dust collected in the second dust collection chamber from entering the rising flow path, and
the lower block surface is formed at a lower end of the outlet base, the sidewall, and the connecting wall.

15. The vacuum cleaner of claim 8, further comprising a mesh support surface that surrounds an upper rim of the mesh,
wherein
the second member further includes an upper block surface formed at an upper end of the outlet base, and
the upper block surface has a circular outer rim to be brought adjacent to an inner circumferential surface of the mesh support surface, and partitions an inlet of the axial inlet type cyclones and a downstream side of the rising flow path to separate air to be introduced into the axial inlet type cyclones and air discharged through the rising flow path.

16. The vacuum cleaner of claim 1, further comprising:
a first dust collection chamber formed in a ring shape inside the housing and formed to collect the dust from the cyclone;
a second dust collection chamber formed in a region surrounded by the first dust collection chamber, and formed to collect the fine dust from the axial inlet type cyclones; and
a second dust collection chamber top cover provided below the axial inlet type cyclones to partition an inlet side of the axial inlet type cyclones and the second dust collection chamber so as to prevent scattering of fine dust collected in the second dust collection chamber,
wherein four holes for the fine dust discharged from the axial inlet type cyclones are formed in the second dust collection chamber top cover, and the four holes are formed, respectively, in the four quadrants.

17. The vacuum cleaner of claim 1, further comprising:
a first dust collection chamber formed in a ring shape inside the housing and formed to collect the dust from the cyclone; and
a second dust collection chamber formed in a region surrounded by the first dust collection chamber, and formed to collect the fine dust from the axial inlet type cyclones,
wherein
the axial inlet type cyclones are formed by a coupling a first member forming the body, the vortex finder and the vane of each of the axial inlet type cyclones and a second member forming the outlet partition portion of each of the axial inlet type cyclones, and
an end portion of an outlet side of a body of the axial inlet type cyclones and an outlet base of the second member are spaced apart from each other to form a fine dust falling flow path communicating with the second dust collection chamber.

18. The vacuum cleaner of claim 17, wherein air outlets of the axial inlet type cyclones and the fine dust falling flow path are alternately formed along the outlet base.

19. The vacuum cleaner of claim 1, wherein the axial lengths of the axial inlet type cyclones are proportional to respective distances between outlets of the axial inlet type cyclone and the housing.

20. A vacuum cleaner, comprising:
a cylindrical housing configured to form an outer appearance of the vacuum cleaner;
a cyclone provided inside the housing and configured to generate a first swirling flow to separate dust from air introduced into the housing;
axial inlet type cyclones configured to receive air and fine dust that have passed through the cyclone, and generate second swirling flows to separate the fine dust from the received air; and
a mesh configured to surround the axial inlet type cyclones and to form a boundary between the cyclone and the axial inlet type cyclones,
wherein
the axial inlet type cyclones are positioned in four groups in four respective quadrants within the housing,
ones of the axial inlet type cyclones included in one of the four groups positioned in one of the quadrants are oriented to face a first direction,
ones of the axial inlet type cyclones included in other ones of the groups that are positioned in other ones of the quadrants are oriented to face other directions that differ from the first direction,
a first dust collection chamber is formed in a ring shape inside the housing and formed to collect the dust from the cyclone,
a second dust collection chamber is formed in a region surrounded by the first dust collection chamber, and is configured to collect the fine dust from the axial inlet type cyclones,
a second dust collection chamber top cover is provided below the axial inlet type cyclones to partition an inlet side of the axial inlet type cyclones and the second dust collection chamber so as to prevent scattering of fine dust collected in the second dust collection chamber, and four holes for the fine dust discharged from the axial inlet type cyclones are formed in the second dust collection chamber top cover, and the four holes are formed, respectively, in the four quadrants.

\* \* \* \* \*